United States Patent [19]

Siskin et al.

[11] 3,901,790

[45] Aug. 26, 1975

[54] CATALYTIC HYDROCRACKING WITH A MIXTURE OF METAL HALIDE AND ANHYDROUS PROTONIC ACID

[75] Inventors: Michael Siskin, Maplewood; Jos P. Wristers, Elizabeth; Joseph J. Porcelli, Scotch Plains, all of N.J.

[73] Assignee: Exxon Research and Engineering Company, Linden, N.J.

[22] Filed: Dec. 22, 1972

[21] Appl. No.: 317,610

[52] U.S. Cl. .............................................. 208/108
[51] Int. Cl. ........................................... C10g 13/08
[58] Field of Search ................................... 208/108

[56] References Cited
UNITED STATES PATENTS

| | | | |
|---|---|---|---|
| 2,446,998 | 8/1948 | Burk | 208/108 |
| 2,865,841 | 12/1958 | Hoekstra | 208/108 |
| 3,091,649 | 5/1963 | Schneider | 260/667 |
| 3,219,574 | 11/1965 | Schneider | 208/108 |
| 3,668,109 | 6/1972 | Kiovsky et al. | 208/108 |
| 3,679,577 | 7/1972 | Wantland et al. | 208/108 |
| 3,764,515 | 10/1973 | Kiovsky | 208/108 |

FOREIGN PATENTS OR APPLICATIONS

| | | | |
|---|---|---|---|
| 438,084 | 11/1935 | United Kingdom | 208/108 |
| 299,021 | 2/1929 | United Kingdom | 208/108 |

Primary Examiner—Delbert E. Gantz
Assistant Examiner—James W. Hellwege
Attorney, Agent, or Firm—R. J. Ott; Jay Simon

[57] ABSTRACT

Hydrocarbons are catalytically hydrocracked in the presence of hydrogen and a mixture of a metal halide, such as tantalum pentafluoride, and an anhydrous protonic acid such as hydrogen fluoride.

18 Claims, No Drawings

CATALYTIC HYDROCRACKING WITH A MIXTURE OF METAL HALIDE AND ANHYDROUS PROTONIC ACID

BACKGROUND OF THE INVENTION

1. Field of the Invention

This invention relates to the catalytic hydrocracking of hydrocarbons. It is more particularly concerned with a process wherein a petroleum hydrocarbon feed is subjected to cracking in the presence of hydrogen and/or a hydrogen donor molecule and a mixture of metal halide and anhydrous acid to produce lower boiling hydrocarbon products.

2. Description of the Prior Art

Hydrocracking operations have heretofore been proposed in which there is employed a catalyst comprising one or more components exhibiting hydrogenation activity, such as the metals of Groups V, VI and VIII of the Periodic Table, either in elemental form or in the form of the oxides or sulfides of these metals. Such components have been deposited by impregnation on alumina and silica-alumina supports. More recently, crystalline aluminosilicates combined with a hydrogenation component such as nickel, cobalt, platinum, etc., have come into use as hydrocracking catalysts.

Conventional hydrocracking operations utilizing the aforementioned catalysts have a number of disadvantages. For example, in order to maintain catalyst activity at a desired level and to avoid a heavy deposition of coke on the catalyst, it has been found necessary to use hydrogen pressures in the order of 1200–2000 pounds per square inch and, in some instances, much higher. Another undesirable characteristic of the hydrocracking processes of the prior art has to do with sulfur-containing stocks. Many catalysts cannot be adequately used with these stocks because they are rendered ineffective, i.e., "poisoned" by sulfur.

SUMMARY OF THE INVENTION

In accordance with the present invention, it has been found that a wide variety of petroleum feedstock, including the sulfur-containing feedstocks, can be hydrocracked at relatively low temperatures and pressures with a catalyst composition comprising a metal halide in combination with at least a molar equivalent of a protonic acid.

The metal halide used in combination with the protonic acid comprises the fluorides, bromides and chlorides (including those halides containing combinations of fluorine, bromine and chlorine) of the following metals: aluminum, gallium, tin, lead, vanadium, niobium, tantalum, arsenic, chromium, molybdenum, tungsten and the rare earth and transuranium metals, such as uranium and neodymium. The preferred metal halide catalyst constituents are tantalum and niobium halides, preferably tantalum pentafluoride, niobium pentafluoride and mixtures thereof.

The protonic acid catalyst component of the invention includes those acids or anhydrides (or mixtures thereof) capable of being a proton donor to the system and further being characterized by the formula HX, $R_aX_bQO_c$ or mixtures thereof where H is hydrogen; X is chlorine, bromine, fluorine and/or iodine; R is hydrogen, $C_1$–$C_4$ alkyl, $C_3$–$C_{10}$ cycloalkyl and/or $C_6$–$C_{10}$ aryl; Q is either phosphorus or sulfur; O is oxygen; $a$ is an integer ranging from 1 to 4 and $b$ and $c$ are integers ranging from 0 to 6. Preferably, the protonic acid is an anhydrous hydrogen halide. Useful materials include hydrogen bromide, hydrogen chloride and hydrogen fluoride, fluorosulfonic acid, mono-fluorophosphoric acid, difluorophosphoric acid, trifluoromethanesulfonic acid, trifluoroacetic acid, bis (perfluoromethylsulfonyl) methane and the like. It is desirable in order to avoid undesirable exchange reactions, that the halide moiety of the hydrogen halide or acid be one that will not cause undesirable exchange reactions with the metal halide constituent of the catalyst system. For example, if tantalum pentabromide is used as the metal constituent, the preferred hydrogen halide co-catalyst would be hydrogen bromide since the halogen moieties of both hydrogen chloride and hydrogen fluoride would exchange with the bromine atoms of the tantalum bromide metal constituent. Desirably, the halide moiety of the hydrogen halide and the metal halide are the same. The preferred hydrogen halide catalyst constituent is hydrogen fluoride.

The relative amounts of metal halide and protonic acid, such as hydrogen halide, may vary widely. In general, at least an equal molar amount of hydrogen halide relative to metal halide should be present in the reaction zone. The protonic acid/metal halide molar ratio is preferably at least 2:1, more preferably at least about 5:1. The upper limit on the protonic acid/metal halide molar ratio is not critical since the protonic acid may also function as a diluent or solvent for the reaction. The maximum amount thereof will be governed by cost and capacity considerations. Depending upon the relative amounts of catalyst constituents used, the catalyst, when no support is employed, may be a homogeneous solution of protonic acid and metal halide or a mixture of solid and dissolved metal halide in protonic acid.

A wide variety of feedstocks undergo hydrocracking in accordance with this invention. Suitable feedstocks include the typical petroleum feedstocks for hydrocracking operations such as gas oils, residual oils, cycle stocks, and the like. The hydrocracking process of this invention may also be used to convert less complex feeds to lower molecular weight products and/or more tractable compounds. Thus, hydrocarbons such as benzene, toluene, xylene, anthracene, phenanthrene, pyrene, chrysene, high molecular weight paraffins (ranging to and including waxes and polymers), naphthenes and the like may be converted in accordance with the invention.

The term "gas oil" as employed in the art includes a variety of petroleum stocks. As utilized herein, this term, unless further modified, includes any fraction distilled from petroleum which has an initial boiling point of at least about 400°F., a 50 percent point of at least about 500°F. and an end point of at least about 600°F. and boiling substantially continuously between the initial boiling point and the end point. The exact boiling range of a gas oil accordingly will be determined by the initial boiling point, the 50 percent point, and by the end point. In practice, petroleum distillations have been effected under vacuum at temperatures as high as 1200°F. (corrected to atmospheric pressure). Accordingly, in the broad sense, a gas oil is a petroleum fraction which boils substantially continuously within an approximate range of 400°F. to 1200°F., the 50 percent point being at least about 500°F. Thus, a gas oil may boil over the entire approximate range of 400°F. to 1200°F. or over an intermediate range such as 500°F. to 900°F.

A residual stock is any fraction which is not distilled. Accordingly, any fraction, regardless of its initial boiling point, which includes heavy bottoms, such as tars, asphalts, etc., is a residual fraction. A residual stock may be the portion of the crude remaining undistilled at about 1200°F. or it may be made up of a gas oil fraction plus the portion undistilled at about 1200°F.

The refractory cycle stocks are cuts of cracked stocks which boil above the gasoline boiling range usually between about 400°F. and about 850°F. The refractory cycle stocks can be charged to the process of this invention, together with a fresh petroleum charge stock or the refractory cycle stocks may be charged to the process alone.

The hydrocracking reaction may be carried out in bulk, that is, in the absence of any solvent or in the presence of a solvent or diluent material. Useful solvent or diluent compositions include fluorinated paraffins, sulfolane, sulfur dioxide, sulfurylchloride fluoride, fluorinated acids and/or acid anhydrides, HF, etc. Hydrogen fluoride is the preferred reaction diluent when the metal portion of the catalyst system is a metal fluoride. When hydrogen fluoride is the diluent with catalysts made up of metal chlorides or bromides, an exchange reaction results converting the metal material to the metal fluoride. When a solvent or diluent is used, sufficient amounts are employed to maintain the viscosity of the reaction mixture at a desired level. Typically, from about 0.10 to 50, preferably from about 1 to 20 volumes of solvent or diluent are used per volume of hydrocarbon feedstock.

Hydrocracking in accordance with the present invention is carried out at a temperature in the range of 0° to 600°C., preferably in the range of 20° to 200°C. Most preferably, the reaction is conducted at a temperature between 20° to 100°C. The hydrocracking reaction is preferably conducted at a pressure sufficient to maintain the hydrocarbon feedstock and catalyst in substantially the liquid phase. In general, the hydrogen partial pressures in the reaction zone will vary from about 25 to 3000, preferably from about 25 to 1000 psig. Typically, from 0.05 to 5.0 moles, preferably from 0.05 to 1.0 moles, of hydrogen per mole of hydrocarbon feedstock are present in the reaction zone. The reaction time will depend upon the temperature used, the nature of the feedstock and the products desired and, thus, may vary widely. In most cases, the reaction time will be within the range of 0.5 minute to 50 hours, preferably within the range of 1 to 250 minutes.

Hydrogen employed in the hydrocracking of the feedstock may be derived from any suitable source. Typically, in a refinery operation, the hydrogen employed may be a crude or an impure hydrogen stream such as that obtained from a naphtha reforming operation. Alternatively, hydrogen may be generated in situ by introducing hydrogen donors into the reaction zone during the course of the reaction. Examples of useful hydrogen donors include materials such as decalin, tetralin, methylcyclohexane and the like. Most preferably, elemental hydrogen is introduced into the reaction zone.

In a typical refinery operation, the process feedstock, hydrogen and optional solvent are admixed with the catalyst in a substantially liquid phase operation. The contacting may be carried out in a plurality of serially connected mixing zones. In this type of operation, the catalyst phase and hydrocarbon phase are separated following reaction and the product recovered from unreacted feedstock utilizing conventional distillation techniques. Optionally, the metal halide catalyst component may be impregnated upon an inert (to hydrogen halide) porous support material such as a fluorinated refractory oxide, fluorinated Vycor glass, graphite, charcoal, polytetrafluoroethylene (Teflon) based supports as Chromosorb T and Fluoropak 80, and the feedstock and hydrogen halide cocatalyst passed over the supported metal halide in either a liquid phase, gaseous phase or mixed phase operation. Alternatively, both the hydrogen halide and metal halide catalyst materials can be impregnated upon an HF-resistant support material and the feedstock passed over the catalyst.

Except when sulfur-containing feedstocks are used, the amount of metal halide catalyst component present in the reaction zone is not always critical. Typically, from about 0.001 to 10, preferably 0.01 to 5.0 weight parts of metal halide are present in the reaction zone per weight part of feedstock. When sulfur impurities are present in the feedstock, it is desirable, if maximum catalyst activity is desired, to have a molar excess of metal halide present in the reaction zone relative to the amount of sulfur poison present in the reaction zone at any point in time. Sulfur and sulfur compounds are believed to form complexes with the metal halide catalyst constituent. An equilibrium is established between the amount of sulfur complex formed and the amount of sulfur in the hydrocarbon phase. Accordingly, not all of the sulfur present reacts with or complexes with the metal halide catalyst constituent. Further, the complex formation reaction appears to be reversible in that the concentration of sulfur complex or reaction product is diminished when the catalyst is contacted with a sulfur-free feedstock. In an operation wherein a support catalyst is used, the reaction liquid hourly space velocity (the liquid volume of feed per hour per volume of catalyst) would be maintained at levels of less than about 200, usually between about 0.1 and 20.

As noted previously, the catalyst system of the present invention is not adversely affected by the presence of sulfur compounds. However, if maximum catalyst activity is desired, the feedstocks, diluents, and individual catalyst constituents should be purified prior to use to remove water, nitrogen, and/or nitrogen-containing compounds, such as amines or ammonia. Nitrogen-containing compounds form more stable compounds or complexes with the catalyst constituents. The presence of small amounts of water or nitrogen-containing materials are tolerable if the corresponding catalyst loss or drop in catalyst activity can be accepted. Preferably, the water or nitrogen compound concentration within the reaction zone should not exceed about 0.01 wt. percent, preferably about 1 wppm, based on total catalyst. Most preferably, the reaction is conducted in the substantial absence of water and/or nitrogen-containing compounds.

DESCRIPTION OF THE PREFERRED EMBODIMENTS

The following examples further illustrate the present invention. Unless otherwise specified, all percentages and parts are by weight.

EXAMPLE 1

Into a 1 liter stainless steel autoclave was placed 200 milliliters of normal pentane, 27.6 grams of tantalum pentafluoride, and 43 grams of hydrogen fluoride. Hydrogen was added until the pressure in the autoclave was 190 pounds per square inch gauge (psig). After the reaction mixture was stirred and heated at 125°C. for four hours, a sample of the hydrocarbon layer was cooled to −70°C. and analyzed by vapor phase chromatography using an Aerograph Model 2700 Gas Chromatograph with a DC 200 on Chromasorb P column (⅛ inch by 30 feet) at 90°C. The results given below show the ability of the catalyst of the invention by hydrocrack paraffins.

| Product Distribution | Volume, % |
|---|---|
| $C_1$ | 0.12 |
| $C_2$ | 3.08 |
| $C_3$ | 29.78 |
| $i-C_4$ | 24.81 |
| $n-C_4$ | 13.38 |
| $i-C_5$ | 7.33 |
| $n-C_5$ | 19.44 |
| $C_6$ | 2.06 |

EXAMPLE 2

Into a 300 ml. monel autoclave was placed 40 ml. (34.5 g.) of a typical hydrocracker feed having a boiling point range of 430°–750°F., 44 percent aromatics and 56 percent paraffins and naphthenes, a nitrogen content of 17.5 ppm and a sulfur content of 82 ppm. To this was added 55.2 g. of tantalum pentafluoride and 39.1 g. hydrogen fluoride. Hydrogen was then added until the pressure inside the autoclave was 755 psig. The contents inside the autoclave were stirred and heated to 80°C. As hydrogen was used up, more was added. Thus, the pressure inside the autoclave varied between 500–800 psig. The total hydrogen consumption was 0.5 − ±0.1 moles.

After 15 hrs. the autoclave was cooled and vented. The gases were collected in a trap kept at −78°C. and subsequently analyzed by vapor phase chromatography using the analytical procedure described in Example 1. The product in the autoclave was poured onto 200 g. of an ice water bath. The mixture was then extracted with 200 ml. n-pentane. This yielded 6.5 g. of a yellowish brown oil. Analysis of all the products showed that about 80% of the starting material had been converted to material boiling less than 350°F. The remainder of the product boiled between 350°–985°F. This demonstrates the ability of the subject catalyst to hydrocrack refinery feeds to a much lower boiling range material with only a minimal, less than 1 percent, of higher boiling material being formed.

EXAMPLE 3

Into a 300 ml. monel autoclave was placed 64.5 g. of normal pentane, 17.8 g. anthracene, 55.2 g. tantalum pentafluoride, and 38.4 g. hydrogen was pressured in, and the contents of the autoclave were stirred and heated at 80°C. Hydrogen was added to the autoclave to maintain a constant pressure of 500 psig.

Samples of the hydrocarbon layer were taken at specific times and analyzed by vapor phase chromatography as in the previous examples. The results obtained are given below.

| | Analysis of Samples, Wt. % | | |
|---|---|---|---|
| Components / Reaction Time | 3 Hours | 9 Hours | 22 Hours |
| $CO_2$, $C_1$, $C_2$ | 0.36 | 0.27 | 1.45 |
| $C_3$ | 0.17 | 0.74 | 5.15 |
| $i-C_4$ | 1.06 | 2.53 | 10.40 |
| $n-C_4$ | 0.30 | 1.29 | 7.67 |
| $i-C_5$ | 75.20 | 66.34 | 49.66 |
| $n-C_5$ | 18.97 | 16.48 | 12.17 |
| 2,2 $DMC_4$ | 0.38 | 1.12 | 4.71 |
| 2,3 $DMC_4$ + 2 $MC_5$ | 0.70 | 1.19 | 4.19 |
| 3 $MC_5$ | 0.23 | 0.43 | 1.58 |
| $n-C_6$ | 0.11 | 0.23 | 0.94 |
| Methylcyclopentane | trace | 0.32 | trace |
| Benzene | 0.95 | 2.42 | 0.08 |
| Cyclohexane | trace | 0.94 | 0.04 |
| $DMC_y$ $C_6$+$C_8$ | 1.92 | 5.67 | 2.22 |

DM = dimethyl, M = methyl, Cy $C_6$ = cyclohexane

After 22 hrs. of reaction, the autoclave was cooled and vented. The product was poured onto 200 g. ice and water. The mixture was then twice extracted with 150 ml. of benzene. The organic extracts were dried and filtered. After the solvent was removed, 4.4 g. of a light yellow solid were recovered. Analysis showed in the solid material to contain 52% anthracene and 30% hydrogenated anthracenes. This example thus demonstrates the hydrocracking of multiring aromatics to a number of desirable compounds.

What is claimed is:

1. A process for hydrocracking a feedstock comprising gas oils, residual oils, cycle stocks, or mixtures thereof which comprises:

1. contacting said feedstock in the presence of hydrogen under hydrocracking conditions to effect both hydrogenation and cracking with a substantially liquid phase catalyst consisting essentially of (a) a metal halide wherein said metal is aluminum, gallium, tin, lead, vanadium, niobium, tantalum, arsenic, chromium, molybdenum, tungsten, rate earth and/or transuranium metal and said halide is fluoride, chloride, bromide and/or iodide, and (b) at least an equal molar amount, based on metal halide, of a protonic acid capable of being a proton donor to the system and further being characterized by the formula HX, R$a$X$b$QO$c$ or mixtures thereof where H is hydrogen; X is chlorine, bromine, fluorine and/or iodine; R is hydrogen, $C_1$–$C_4$ alkyl, $C_3$–$C_{10}$ cycloalkyl and/or $C_6$–$C_{10}$ aryl; Q is either phosphorus or sulfur; O is oxygen; $a$ is an integer ranging from 1 to 4 and $b$ and $c$ are integers ranging from 0 to 6; and 2. recovering a product having an average molecular weight lower than the average molecular weight of the feedstock.

2. The process of claim 1 wherein said protonic acid is anhydrous hydrogen fluoride, hydrogen bromide, hydrogen chloride or mixtures thereof.

3. The process of claim 2 wherein the molar ratio of hydrogen halide to metal halide present is at least 2:1.

4. The process of claim 3 wherein the temperature is within the range between about 20° and 200°C.

5. The process of claim 4 wherein said metal halide is a metal fluoride and said hydrogen halide is hydrogen fluoride.

6. The process of claim 5 wherein said metal fluoride is tantalum pentafluoride, niobium pentafluoride or mixtures thereof.

7. The process of claim 1 wherein said catalyst is comprised of 1. tantalum pentafluoride, and 2. anhydrous hydrogen fluoride.

8. The process of claim 7 wherein the molar ratio of hydrogen fluoride to tantalum pentafluoride present is at least 5:1.

9. The process of claim 1 wherein said catalyst is comprised of 1. niobium pentafluoride, and 2. anhydrous hydrogen fluoride.

10. The process of claim 9 wherein the molar ratio of hydrogen fluoride to niobium pentafluoride is at least 5:1.

11. The process of claim 2 wherein said metal halide is dissolved in said protonic acid.

12. The process of claim 11 wherein said feedstock additionally contains sulfur impurities and the metal halide is present in the reaction zone in a molar excess relative to the amount of sulfur present in said feedstock.

13. The process of claim 1 wherein the process is effected at temperatures ranging from 20° to 200°C.

14. A process for hydrocracking a feedstock comprising gas oils, residual oils, cycle stocks, and mixtures thereof which comprises:

1. contacting said feedstock in the presence of hydrogen under hydrocracking conditions to effect both hydrogenation and cracking with a substantially liquid phase catalyst comprised of: (a) a metal halide selected from the group consisting of tantalum halides, niobium halides, and mixtures thereof, and (b) a hydrogen halide, present in an amount such that the molar ratio of hydrogen halide to metal halide is at least equal molar and at least some of the metal halide is dissolved in the hydrogen halide, and 2. recovering a product having an average molecular weight lower than the average molecular weight of the feedstock.

15. The process of claim 14 wherein the feedstock additionally contains sulfur impurities and the metal halide is present in the reaction zone in a molar excess relative to the amount of sulfur present in said feedstock.

16. The process of claim 15 wherein the halide of the metal halide is a fluoride.

17. The process of claim 14 wherein the process is effected at temperatures ranging from 20° to 200°C.

18. The process of claim 14 wherein the molar ratio of hydrogen halide to metal halide is at least 2:1.

* * * * *